(12) United States Patent
Dasnoy et al.

(10) Patent No.: US 12,583,638 B2
(45) Date of Patent: Mar. 24, 2026

(54) METHOD FOR FILLING VIALS CONTAINING LIQUID DRUG PRODUCTS

(71) Applicant: UCB BIOPHARMA SRL, Brussels (BE)

(72) Inventors: Sebastien Dasnoy, Brussels (BE); Laura Simonin, Brussels (BE)

(73) Assignee: UCB BIOPHARMA SRL, Brussels (BE)

( * ) Notice: Subject to any disclaimer, the term of this patent is extended or adjusted under 35 U.S.C. 154(b) by 2 days.

(21) Appl. No.: 18/561,759

(22) PCT Filed: May 18, 2022

(86) PCT No.: PCT/EP2022/063492
§ 371 (c)(1),
(2) Date: Nov. 17, 2023

(87) PCT Pub. No.: WO2022/243396
PCT Pub. Date: Nov. 24, 2022

(65) Prior Publication Data
US 2024/0228082 A1    Jul. 11, 2024

(30) Foreign Application Priority Data

May 19, 2021    (GB) ..................................... 2107153

(51) Int. Cl.
*B65B 3/00* (2006.01)
*G01F 22/00* (2006.01)

(52) U.S. Cl.
CPC .............. *B65B 3/003* (2013.01); *G01F 22/00* (2013.01)

(58) Field of Classification Search
CPC ........... B65B 3/003; B65B 3/00; B65B 3/006; B65B 3/02; B65B 3/04; B65B 3/16; B65B 3/17; B65B 3/24; B65B 3/26; B65B 3/30; G01F 22/00; G01F 22/02; A61M 2207/00; A61M 1/1522; A61M 1/1524; A61M 1/154; A61M 1/155; A61M 2005/3114; A61M 2205/3379; A61M 2209/045; A61M 5/1782
See application file for complete search history.

(56) References Cited

U.S. PATENT DOCUMENTS

| | | | |
|---|---|---|---|
| 6,382,035 B1 | 5/2002 | Nichols | |
| 2002/0035412 A1 | 3/2002 | Kircher et al. | |
| 2011/0229490 A1 | 9/2011 | Li et al. | |
| 2018/0066938 A1* | 3/2018 | Hu | G01F 22/00 |
| 2020/0155760 A1* | 5/2020 | Dix | A61M 5/1782 |

FOREIGN PATENT DOCUMENTS

| | | |
|---|---|---|
| CA | 2 505 093 | 6/2004 |
| CA | 2 728 386 | 12/2008 |

OTHER PUBLICATIONS

Written Opinion in International Application No. PCT/EP2022/063492, Sep. 19, 2022, pp. 1-6.
Manger, W. "Sterile Drug Product Process Validation" *Parental Medications* 4$^{th}$ $^{Edition}$, 2019, pp. 841-862, Chapter 39, CRC Press.

* cited by examiner

*Primary Examiner* — Veronica Martin
(74) *Attorney, Agent, or Firm* — SALIWANCHIK, LLOYD & EISENSCHENK

(57) ABSTRACT

The invention relates to the pharmaceutical field and in particular to methods related to the filling of containers containing liquid-in-vial drug products.

19 Claims, 5 Drawing Sheets

A

B

C

METHOD FOR FILLING VIALS CONTAINING LIQUID DRUG PRODUCTS

CROSS-REFERENCE TO RELATED APPLICATION

This application is the U.S. national stage application of International Patent Application No. PCT/EP2022/063492, filed May 18, 2022.

FIELD OF INVENTION

The invention relates to the pharmaceutical field and in particular to methods related to the filling of containers containing liquid-in-vial drug products.

BACKGROUND OF THE INVENTION

When containers for liquid and freeze-dried drug products are filled-in, a slight volume excess—also referred to as excess volume or overfill volume ($V_{overfill}$)—is allowed to ensure the target volume (also referred to label-claim volume or labelled volume ($V_{label}$)) can be extracted/withdrawn and dispensed (USP<1>, USP<1151>, USP<697>, Ph. Eur. monograph 2.9.17). The overfill is needed as losses happen at different levels, such as in the container-closure system and withdrawal device, in which residual volumes remain. Said excess volume has to be determined for each given drug product, each presentation (formulation, vial size, etc.) very early in the development of said drug product. Tests for estimating the extractable volume are proposed in the European Pharmacopoeia (Ph. Eur. monograph 2.9.17, published in July 2019).

The excess volume should be minimized as much as possible to prevent unsafe handling (FDA Guidance for Industry, 2015) and limit drug product waste (Gotham et al., 2019; Hatswell et al., 2019). The excess volume is recommended to be defined based on the hold-up volume in vial, withdrawal syringe and needle ($V_{HU}$), the filling line variation, and the extractable volume test method variability (Manger 2019). In practice, the excess volume of a given drug product is often defined experimentally, taking into account the hold-up volume and filling process tolerance (Dixon and Gudinas 2018; Sethuraman et al., 2010), calculated as a multiple of the standard deviation obtained from historical data (Sethuraman et al., 2010; Joglekar, 2010; Kruszynski, 2016; Levine, 2017) (FIG. 1, Panel A), and does not include other sources of variabilities, such as the extractable volume test method variability. It was also suggested to take viscosity and/or specificity of the container into account in order to derive a regression model that could then be used for predicting $V_{HU}$ (Mehta et al., 2020; Jameel et al., 2015; Akers et al., 2016), The Health Authorities proposed recommended excess volume per type of containers (see FDA guidance USP <1151>; See Table 1).

The concern of regulators, however, is that either too much or too little product are filled into their vials. Such excesses and deficiencies may result in medication errors and may lead to misuse of leftover drug product or pooling of vials to obtain a single dose (FDA Guidance for Industry, 2015). Even more concerning to regulators, the pooling of doses or repeated use of a single vial can increase the exposure of patients to adverse events, most notable those caused by microbial contamination.

There remains a need to predict the excess volume of a liquid drug product that is needed and thus optimizing the filling method. A prediction model could provide a first guess of the volume range to be tested to support overfill volume definition.

Definitions

The terms "excess volume", "overfill volume" or "$V_{overfill}$" refer to the slight volume excess of a liquid drug product that is added to a container (such as a glass vial), ensuring that the target volume (also referred to labelled volume, label-claim volume or $V_{label}$), can be extracted/withdrawn, for instance for administration to a subject. The excess volume is typically expressed in µl or ml.

The term "hold-up volume", "residual volume" or $V_{HU}$" refers to the residual volume in the vial and/or the withdrawal syringe during extractable volume testing or upon extraction and/or administration of the liquid drug product, and depends in particular on the viscosity of the liquid drug product and the vial neck diameter. The hold-up volume is typically expressed in µl or ml.

The term "container", as used herein, refers broadly to a reservoir suitable for retaining the drug product in liquid form. Examples of containers that can be used in the present invention include an ampoule, a glass vial, a tube, a bottle, a syringe (such as a pre-filled syringe), cartridges, or other such reservoir suitable for delivery of the liquid drug product to the patient via injection.

The term "sigma filling" (i.e. $\sigma_{filling}$) refers to the filling volume standard deviation/variability of the filling equipment used or to be used to fill-in the container with the liquid drug product. Filling variability is typically determined by weighting several containers filled subsequently at a given target fill weight. It is typically expressed in µl or ml.

The term "sigma analysis" (i.e. $\sigma_{analysis}$) refers to the extractable volume testing standard deviation/variability. The extractable volume variability is typically determined by performing extractable volume testing on several replicate vials. It is typically expressed in µl or ml.

The term "sigma total" (i.e. $\sigma_{total}$) corresponds to the total standard deviation (or total variability), combining the filling standard deviation and the extractable volume testing standard deviation. It is typically expressed in µl or ml.

The term "$RSD_{filling}$" corresponds to the relative filling standard deviation (precision) and is calculated as follows $RSD_{filling} = \sigma_{filling}/(V_{label} + V_{HU})$.

The term "$RSD_{analysis}$" corresponds to the relative extractable volume test method standard deviation/variability and is calculated as follows $RSD_{analysis} = \sigma_{analysis}/V_{HU}$.

The term "k" is a value which corresponds to the tolerance factor, i.e. it corresponds to a safety margin, set up at the discretion of the skilled person performing the calculation, for instance it corresponds to a safety margin of 90%, 95%, 99%, etc. It is chosen from the Normal distribution table (see World Wide Web: z-table.com/).

The term "$B_{filling}$" corresponds to the filling bias, i.e. the difference between the target and actual average fill volume. Filling bias is typically determined by weighting several containers filled subsequently at a given target fill weight. It is typically expressed in µl or ml.

The term "$RB_{filling}$" corresponds to the average relative filling bias and is calculated as follows $$RB_{filling} = B_{filling}/(V_{label} + V_{HU}). \qquad 5$$

The terms "therapeutic peptide", "therapeutic polypeptide" or "therapeutic protein" refer to a peptide, a polypeptide or a protein such as a cytokine, a growth factor, a hormone, an antibody or a fusion protein, for therapeutic use. Preferably the peptide, polypeptide or protein is recombinant, i.e. produced by recombinant method.

The term "antibody" as used here includes, but is not limited to, monoclonal antibodies, polyclonal antibodies and recombinant antibodies that are generated by recombinant technologies as known in the art. "Antibody" include antibodies of any species, in particular of mammalian species; such as human antibodies of any isotype, including IgG1, IgG2a, IgG2b, IgG3, IgG4, IgE, IgD and antibodies that are produced as dimers of this basic structure including IgGA1, IgGA2, or pentamers such as IgM and modified variants thereof; non-human primate antibodies, e.g. from chimpanzee, baboon, rhesus or cynomolgus monkey; rodent antibodies, e.g. from mouse, or rat; rabbit, goat or horse antibodies; camelid antibodies (e.g. from camels or llamas such as Nanobodies™) and derivatives thereof; antibodies of bird species such as chicken antibodies; or antibodies of fish species such as shark antibodies. The term "antibody" also refers to "chimeric" antibodies in which a first portion of at least one heavy and/or light chain antibody sequence is from a first species and a second portion of the heavy and/or light chain antibody sequence is from a second species. Chimeric antibodies of interest here include "primatized" antibodies comprising variable domain antigen-binding sequences derived from a non-human primate (e.g. Old-World Monkey, such as baboon, rhesus or cynomolgus monkey) and human constant region sequences. "Humanized" antibodies are chimeric antibodies that contain a sequence derived from non-human antibodies. For the most part, humanized antibodies are human antibodies (recipient antibody) in which residues from a hypervariable region of the recipient are replaced by residues from a hypervariable region [or complementarity determining region (CDR)] of a non-human species (donor antibody) such as mouse, rat, rabbit, chicken or non-human primate, having the desired specificity, affinity, and activity. In most instances residues of the human (recipient) antibody outside of the CDR; i.e. in the framework region (FR), are additionally replaced by corresponding non-human residues. Furthermore, humanized antibodies may comprise residues that are not found in the recipient antibody or in the donor antibody. These modifications are made to further refine antibody properties. Humanization reduces the immunogenicity of non-human antibodies in humans, thus facilitating the application of antibodies to the treatment of human disease. Humanized antibodies and several different technologies to generate them are well known in the art. The term "antibody" also refers to human antibodies, which can be generated as an alternative to humanization. For example, it is possible to produce transgenic animals (e.g., mice) that are capable, upon immunization, of producing a full repertoire of human antibodies in the absence of production of endogenous murine antibodies. Other methods for obtaining human antibodies/antibody fragments in vitro are based on display technologies such as phage display or ribosome display technology, wherein recombinant DNA libraries are used that are either generated at least in part artificially or from immunoglobulin variable (V) domain gene repertoires of donors. Phage and ribosome display technologies for generating human antibodies are well known in the art. Human antibodies may also be generated from isolated human B cells that are ex vivo immunized with an antigen of interest and subsequently fused to generate hybridomas which can then be screened for the optimal human antibody. The term "antibody" refers to both glycosylated and aglycosylated antibodies. Furthermore, the term "antibody" as used herein not only refers to full-length antibodies, but also refers to antibody fragments, more particularly to antigen-binding fragments thereof. A fragment of an antibody comprises at least one heavy or light chain immunoglobulin domain as known in the art and binds to one or more antigen(s). Examples of antibody fragments according to the invention include a Fab, modified Fab, Fab', modified Fab', F(ab')2, Fv, Fab-Fv, Fab-dsFv, Fab-Fv-Fv, scFv and Bis-scFv fragment. Said fragment can also be a diabody, tribody, triabody, tetrabody, minibody, single domain antibody (dAb) such as sdAb, VL, VH, VHH or camelid antibody (e.g. from camels or llamas such as a Nanobody™) and VNAR fragment. An antigen-binding fragment according to the invention can also comprise a Fab linked to one or two scFvs or dsscFvs, each scFv or dsscFv binding the same or a different target (e.g., one scFv or dsscFv binding a therapeutic target and one scFv or dsscFv that increases half-life by binding, for instance, albumin). Exemplary of such antibody fragments are FabdsscFv (also referred to as BYbe®) or Fab-(dsscFv)2 (also referred to as TrYbe®, see WO2015/197772 for instance). Antibody fragments as defined above are known in the art.

The term «ρ» corresponds the density of the liquid drug product. It is herein expressed in g/mL. But alternatively, it can be expressed in g/L or kg/L (mainly for liquids) or in $kg/m^3$ or $g/cm^3$ (mainly for solids) for example.

The term «η» corresponds to the dynamic viscosity of the liquid drug product. It is expressed indifferently in cP or alternatively in mPa·s.

DETAILED DESCRIPTION OF THE INVENTION

In order to meet the label claim volume, containers comprising liquid-in-vial drug products are typically filled with a slight excess volume (they are overfilled). In certain cases, should the skilled person be willing to take high risks of not meeting the label claim volume, when overfilling the containers, they could consider that $V_{overfill}=V_{HU}$. However, according to the current practice, the skilled person considers that $V_{overfill}=V_{HU}+k×σ_{filling}$.

It is a finding from the inventors that it was possible to better predict, or determine, the hold-up volume of liquid-in-vial drug products in a container and withdrawal syringe, as well as the excess volume of liquid-in-vial drug products to be added in a container comprising the liquid drug product, based only on a few parameters, including the residual volume of the liquid drug product in the type of container of interest, the variability of container and extractable volume testing as well as a tolerance factor. Further parameters can also be included such as the product viscosity (as measured at 20° C. for example) and the container neck diameter. Thanks to these methods, it is possible to predict/determine more accurately the excess volume to be added for each liquid drug product and each type of container, leading, among various advantages, to a reduction of experimental testing to support the overfill/excess volume definition. The methods herein described can be used for any type of container, and allow capturing all sources of variation, in order to limit the risk of not meeting the extractable volume specification. In addition, these models can help in defining a maximum overfill volume value, to avoid possible patient safety concerns. Overall, these methods lead to a better process control. The basic concept of the invention is illustrated in FIG. 1.

The main object of the present invention is a method of predicting an excess volume ($V_{overfill}$) of a liquid drug product to be added in a container comprising the liquid drug product, to ensure that the label-claim volume can be withdrawn from the container, wherein the method comprises using a computer to implement the following steps:
   a) receiving a first set of values, wherein said first set of values comprises:
      i. an expected residual volume ($V_{HU}$) of the liquid drug product in the container and a withdrawal syringe after dispensing of the liquid drug product from the container using the withdrawal syringe;
      ii. a total variability ($\sigma_{total}$) of container filling of a filling equipment to be used to fill the container with the liquid drug product, and extractable volume testing;
      iii. a predetermined tolerance factor (k);
   b) predicting the excess volume by performing a summation over at least $V_{HU}$ and $k \times \sigma_{total}$, as shown in the following equation (1), $$V_{overfill} = V_{HU} + k \times \sigma_{total} + A$$

where A represents an optional one or more further terms in the summation, and
   c) outputting the predicted excess volume to be added.

The excess volume is the volume of liquid drug product required in the container in addition to a label-claim volume ($V_{label}$), before dispensing of the liquid drug product, to ensure that the label-claim volume can be withdrawn, from the container and from the withdrawal/dispensing device (such as a withdrawal/administration syringe), and thus dispensed, for instance, to at least one subject. Therefore, also herein described is a method of predicting an excess volume ($V_{overfill}$) of a liquid drug product to be added in a container comprising the liquid drug product, the excess volume being the volume of liquid drug product required in the container in addition to a label-claim volume ($V_{label}$), before dispensing of the liquid drug product, to ensure that the label-claim volume can be withdrawn from the container, wherein the method comprises using a computer to implement the following steps:
   a) receiving a first set of values, wherein said first set of values comprises:
      i. an expected residual volume ($V_{HU}$) of the liquid drug product in the container and a withdrawal syringe after dispensing of the liquid drug product from the container using the withdrawal syringe;

ii. a total variability ($\sigma_{total}$) of container filling of a filling equipment to be used to fill the container with the liquid drug product, and extractable volume testing;
      iii. a predetermined tolerance factor (k);
   b) predicting the excess volume by performing a summation over at least $V_{HU}$ and $k \times \sigma_{total}$, as shown in the following equation (1), $$V_{overfill} = V_{HU} + k \times \sigma_{total} + A$$

where A represents an optional one or more further terms in the summation, and
   c) outputting the predicted excess volume to be added.

Another object of the invention is a method of predicting an excess volume ($V_{overfill}$) of a liquid drug product to be added in a container comprising the liquid drug, wherein the method comprises the steps of:
   a) collecting a first set of values, wherein said first set of values comprises:
      i. an expected residual volume ($V_{HU}$) of the liquid drug product in the container and a withdrawal syringe after dispensing of the liquid drug product from the container using the withdrawal syringe;
      ii. a total variability ($\sigma_{total}$) of container filling of a filling equipment to be used to fill the container with the liquid drug product, and extractable volume testing;
      iii. a predetermined tolerance factor (k);
   b) predicting the excess volume by performing a summation over at least $V_{HU}$ and $k \times \sigma_{total}$, as shown in the following equation (1), $$V_{overfill} = V_{HU} + k \times \sigma_{total} + A$$

where A represents an optional one or more further terms in the summation.

The excess volume corresponds to the volume of liquid drug product required in the container in addition to a label-claim volume ($V_{label}$), before dispensing of the liquid drug product, to ensure that the label-claim volume can be withdrawn, from the container and from the withdrawal/dispensing device (such as a withdrawal/administration syringe), and then dispensed, for instance, to at least one subject. Thus, also herein described is a method of predicting an excess volume ($V_{overfill}$) of a liquid drug product to be added in a container comprising the liquid drug product, the excess volume being the volume of liquid drug product required in the container in addition to a label-claim volume ($V_{label}$), before dispensing of the liquid drug product, to ensure that the label-claim volume can be withdrawn from the container, wherein the method comprises the steps:
   a) collecting a first set of values, wherein said first set of values comprises:
      i. an expected residual volume ($V_{HU}$) of the liquid drug product in the container and a withdrawal syringe after dispensing of the liquid drug product from the container using the withdrawal syringe;
      ii. a total variability ($\sigma_{total}$) of container filling of a filling equipment to be used to fill the container with the liquid drug product, and extractable volume testing;
      iii. a predetermined tolerance factor (k);
   b) predicting the excess volume by performing a summation over at least $V_{HU}$ and $k \times \sigma_{total}$, as shown in the following equation (1), $$V_{overfill} = V_{HU} + k \times \sigma_{total} + A$$

where A represents an optional one or more further terms in the summation.

In the methods according to the invention as a whole, k has preferably a value ranged from 1.64 ($z_{0.95}$) to 2.78 ($z_{0.9973}$). The specific value will depend on the appetite of risk to be taken of not withdrawing the label-claim volume. It is a personal or company decision. This is based on the well-known z-Table, used in hypothesis testing.

In an alternative embodiment of any methods herein described, the first set of values to be collected/received (step a) further includes the average filling bias ($B_{filling}$). In such a case, equation (1) is amended in equation (1bis):

$$V_{overfill} = V_{HU} + B_{filling} + k \times \sigma_{total}.$$

In other words, the predicting of the excess volume comprises performing a summation over at least $V_{HU}$, $k \times \sigma_{total}$, and $B_{filling}$, as shown in the following version (1bis) of equation (1):

$$V_{overfill} = V_{HU} + B_{filling} + k \times \sigma_{total}.$$

Including this parameter improves even more the accuracy of the methods but is not mandatory, as the initial formula already provides a high level of accuracy. When the $B_{filling}$ is used, it can be predetermined experimentally.

In the context of the invention as a whole, the value $V_{HU}$ can be determined, or predicted, according to various methods. One method to determine $V_{HU}$ comprises the main steps of:

a) weighing an empty container to be filled-in with a liquid drug product to obtain $W_{tare}$, b) filling the container with a given volume of the liquid drug product, c) weighing the filled-in container to obtain $W_{full}$, d) obtaining the weight of the product contained in the container ($W_{prod}$), wherein $W_{prod} = W_{full} - W_{tare}$, d) withdrawing the liquid drug product from the container with a syringe, e) expelling the entire content of the filled syringe in another tared, clean and dry container, without emptying the needle, f) weighing the extracted liquid in the filled container to obtain a value $W_{extr}$, g) determining $V_{HU}$ using the following equation (2): $V_{HU} = (W_{prod} - W_{extr})/\rho$, wherein $\rho$ is the density of the liquid drug product.

In the context of this alternative method, the given volume of the liquid product can be any volume as long as it is a volume slightly above the possible $V_{HU}$ (such as determined by the current method, see e.g. USP <1151> and Table 1) and not more than the volume needed to completely fill the container. For example, should the Labelled volume (or labelled size) be 2 mL, and the drug product be mobile, the given volume to be filled in will be any volume at least slightly above 0.15 mL. In another example, should the Labelled volume (or labelled size) be 10 mL, and the drug product be viscous, the given volume to be filled in will be any volume at least slightly above 0.70 mL.

An alternative method to determine $V_{HU}$ comprises the main steps of:

a) filling an empty container with a given weight of liquid drug product ($W_{prod}$), b) withdrawing the liquid drug product from the container with a syringe, c) expelling the entire content of the filled syringe in another tared, clean and dry container, without emptying the needle, d) weighing the extracted liquid in the filled container to obtain a value $W_{extr}$.

e) determining $V_{HU}$ using the following equation (2): $V_{HU} = (W_{prod} - W_{extr})/\rho$, wherein $\rho$ is the density of the liquid drug product.

This method is exemplified in FIG. 2. In the context of this alternative method, the given fill weight of the liquid product can be any weight as long as it corresponds to a volume slightly above the possible $V_{HU}$ (such as determined by the method described in USP <1151>, e.g. 10%) and not more than the fill weight corresponding to the volume needed to completely fill the container. However, the inventors have surprisingly identified a method according to which the value $V_{HU}$ can be predicted, or determined, simply based on the viscosity of the drug product and on the container neck diameter. Therefore, herein described is a method to determine, or to predict, the residual volume of a liquid drug product in a container and a withdrawal syringe ($V_{HU}$); the method comprising determining, or predicting, $V_{HU}$ according to the following equation (3):

$$V_{HU} = V_{HU}^{water} \times \eta^{1/7},$$

where $V_{HU}^{water}$ is a value depending on the neck diameter and wherein $\eta$ corresponds to the viscosity of the liquid drug product. In particular, it was found by the inventors that should the container have a neck diameter of 13 mm (such as a glass vial of type 2R), and $V_{HU}^{water}$ a value of 174 (when viscosity is measured at room temperature, such as at 20° C. for example), then the equation to determine, or to predict $V_{HU}$ will be $V_{HU} = 174 \times \eta^{1/7}$. In another example, it was found by the inventors that should the container have a neck diameter of 20 mm (such as a glass vial of type 6R, 10R or 20R), $V_{HU}^{water}$ has a value of 262 (when viscosity is measured at room temperature, such as at 20° C. for example) and thus the equation to determine, or to predict $V_{HU}$ will be $V_{HU} = 262 \times \eta^{1/7}$. Should this method be used to predict, or to determine, the excess volume ($V_{overfill}$) of the liquid drug product to be added, in the context of the invention as a whole, the first set of values to be received, or collected, in addition to $V_{HU}$, $\sigma_{total}$, and k, will comprise the viscosity, $\eta$, of the liquid drug product (as measured at 20° C. for instance) and the container neck diameter. The advantage of using a container (such as a glass vial) having a neck diameter of either 13 mm or 20 mm is that the determination, or the prediction, of $V_{HU}$ is straightforward, i.e. no actual weighing is needed. $V_{HU}^{water}$ can be determined for any type of container based on the teaching of the example section. The only further information that needs to be known is the viscosity, $\eta$, of the liquid drug product (as measured at 20° C. for instance).

In the context of the invention as a whole, $\sigma_{total}$ can be calculated using the following equation (E4):

$$\sigma_{total} = \sqrt{\sigma_{filling}^2 + \sigma_{analysis}^2}$$

Wherein $\sigma_{filling}$ is the filling standard deviation of the equipment used to fill-in the container, $\sigma_{analysis}$ is the analytical test method standard deviation (alternatively called extractable volume testing variability). $\sigma_{filling}$ can be determined for instance by weighing several containers filled subsequently at a given target fill weight. $\sigma_{analysis}$ can be determined for instance by performing extractable volume testing on several replicate vials.

When any of the methods of predicting an excess volume, as herein described, are implemented by a computer, the output of the predicted excess volume is a value transmitted to a database, a dataset, a computer readable memory, a computer readable medium, a computer processor, a computer network, a printout device, a visual display, or a wireless receiver, optionally to allow display of the predicted excess volume via any means such as on a computer monitor or on any device screen as a text or as a graph, printing out of the predicted excess volume as a text or as a graph, or communication of the predicted excess volume as sound, for example by output via a computer system.

Also disclosed herein is a method for filling a container with a liquid drug product, wherein the method comprises the steps of:

a) providing a container to be filled;

b) filling the container with a total volume of liquid drug product wherein the total volume of the liquid drug product corresponds to the label-claim volume of the container plus an excess volume, wherein the excess volume is determined according to any method herein described, and c) optionally closing the container with at least a stopper.

In the context of the invention as a whole, the liquid drug product is preferably withdrawn from the container using a withdrawal syringe. Such syringe can thus be used for administration to a subject in need of said drug product, in such a case the withdrawal needle of the syringe will be preferably replaced by an administration needle.

In the context of the present invention, the container can be an ampoule, a glass vial, a tube, a bottle, a syringe, a cartridge, or other such reservoir suitable for storage of a liquid drug product. For instance, the container can be a glass bottle and have a neck size of from 13 mm to 56 mm and having a nominal volume of between about 5 mL to 500 mL. As another example, it can be a glass vial compliant with ISO standard (such as ISO8362 standard) having a neck size of 13 mm or 20 mm and having a nominal volume of between about 2 mL to 100 mL. These vials are also known as 2R, 4R, 6R, 8R, 10R, 15R, 20R, 30R, 50R and 100R. For examples, according to the ISO8362 standard, glass vials 2R and 4R will have a neck diameter of 13 mm and have a capacity respectively of 4 and 6 mL and glass vials 6R to 100R will have a neck diameter of 20 mm and have a capacity of respectively 10, 11.5, 13.5, 19, 26, 32.5, 37.5, 62 and 123 mL. Although the methods herein disclosed could be applicable to containers having a neck of above 56 mm and a nominal volume of above 500 mL, there is no need to overfill said containers as they are typically used for containing drug products which administration needs less precision.

In the context of the invention as a whole the liquid drug product is either a liquid drug product or a liquid drug product obtained after reconstitution of a freeze-dried or spray dried drug product. The drug product can be any drug product containing either a chemical compound (alternatively herein named Small Molecule Drug or SMD) or a biological compound as an active ingredient. Should the drug product contain a biological compound, said biological compound can be any therapeutic peptides, polypeptides or proteins, such as a cytokine, a growth factor, a hormone, an antibody or a fusion protein.

In the context of the invention as a whole, the viscosity of the liquid drug product is preferably comprised between 1 and 100, even preferably between 1 and 50, and is expressed in cP or alternatively in mPa·s. Thus, the viscosity of the liquid drug product is preferably comprised between 1 and 100 cP (alternatively expressed as 1 and 100 mPa·s), even preferably between 1 and 50 cP (alternatively expressed as 1 and 50 mPa·s). In the context of the invention as a whole, the viscosity, η is preferably measured at room temperature, such as between 15 and 25° C., for example 18 or 20° C.

EXAMPLES

Basis of the Invention

Liquid drug products (also known as liquid-in-vial drug products) are typically overfilled in their containers to meet the label-claim volume, while considering for losses in the container, closure system and withdrawal device. Not only deviations to the maximum overfill values defined by the guidelines (e.g. USP <1151>) need to be justified based on experimental data but any overfill volume setting requires justification. The aim of this study was to predict the excess volume required for a vialled liquid drug product using a total variability approach including the filling and extractable volume testing variabilities.

In short, glass vials sizing from 2R to 20R capacity were filled with sorbitol-based aqueous solutions having a viscosity at 20° C. ranging from 1 to 40 mPa·s. Viscosity and vial neck diameter were shown to be the main contributors to the hold-up volume of sorbitol-based aqueous solutions in vial and withdrawal syringe. The hold-up volume (alternatively called $V_{HU}$) of various molecules of therapeutic interest was successfully estimated using a model built from sorbitol-based aqueous solutions data.

A total variability approach is therefore proposed for predicting the excess volume of liquid-in-vial drug products, considering product viscosity, vial neck diameter, filling variability and extractable volume test variability. The use of this prediction model could allow reducing testing to support excess volume definition, especially in early phases of development where drug substance availability can be limited. It could replace the standard methods currently on use.

Materials

Drug products used in the examples section are defined in Table 5.

Methods

Vial filling: The hold-up volume determination focused on 3 factors: viscosity (7 levels in the 1-40 mPa·s range), vial format (4 levels: 2R, 6R, 10R and 20R) and fill volume (5 levels per vial format: 2R-1.10, 1.20, 1.30, 1.40 and 1.50 mL; 6R-3.20, 3.30, 3.40, 3.50 and 3.60 mL; 10R-5.20, 5.35, 5.50, 5.65 and 5.80 mL; 20R-10.20, 10.40, 10.60, 10.80 and 11.00 mL). A full factorial design approach (all combinations of factors and levels) was followed, leading to 140 experimental conditions. The tare weight ($W_{tare}$—vial, stopper and overseal) was measured prior to filling (see FIG. 2). A minimum of 2 replicates per condition were prepared. Vials were filled by weight considering the density of sorbitol solutions (Table 2). The net fill weight was recorded ($W_{fill}$). All vials were stoppered and crimped with aluminium overseals.

Figure 2:
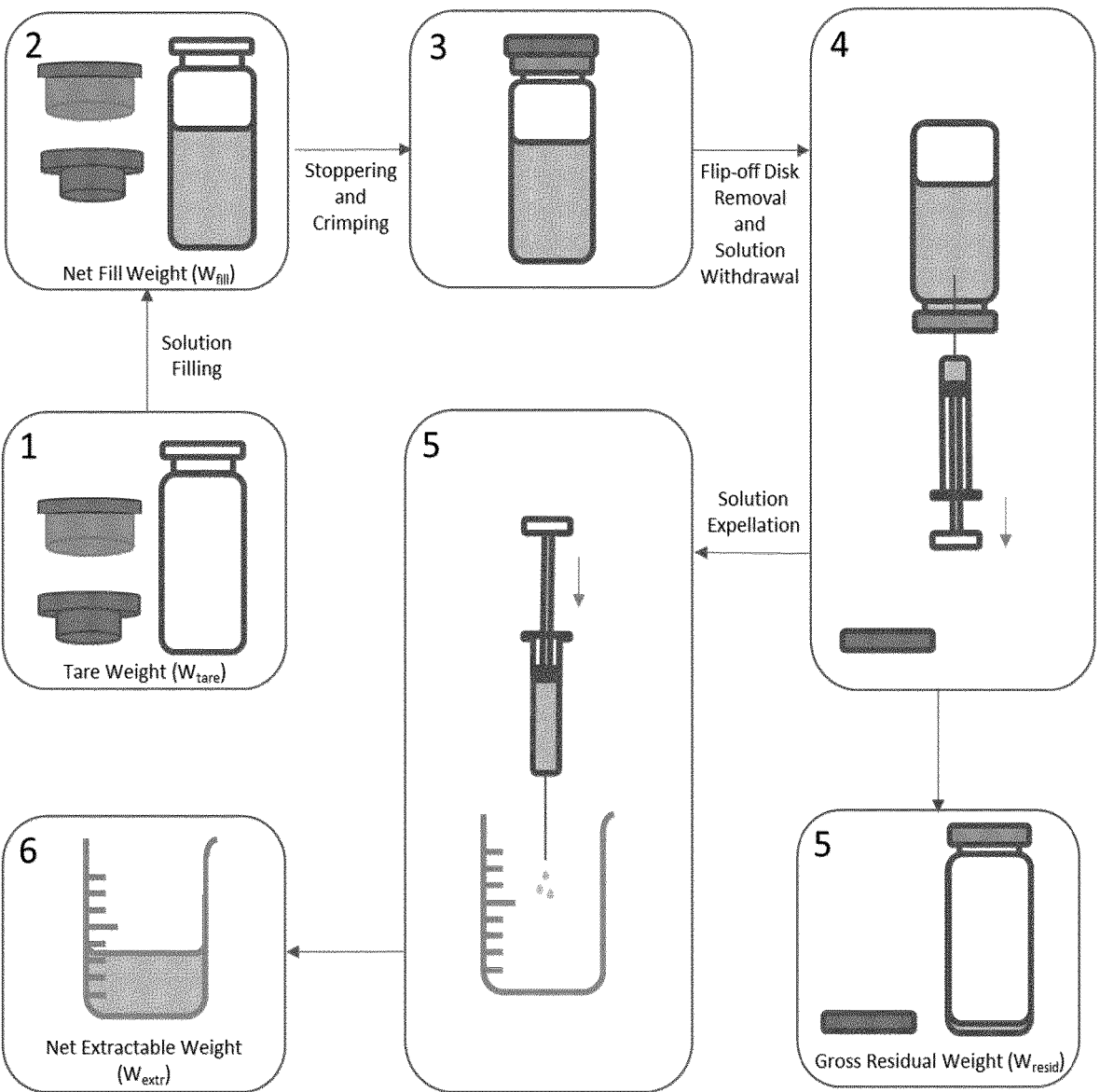
FIG. 2: One method for vial filling and extractable volume testing.

Extractable volume testing: Vials were filled with sorbitol solutions. The syringes were suitably sized to the volumes to be extracted: 2R vials-3 mL syringes, 6R vials-5 mL syringes, 10R vials-10 mL syringes, 20R vials-20 mL syringes. 19 G×1½" needles—wider than the recommended 21 G needles of not less than 1" length (see e.g. USP <1>; USP <697>; JP General Test 6.05; FDA Guidance for Industry, 2015 or ICH Q4B Annex 2 (R1))—were used to limit the withdrawal force required for viscous solutions during extractable volume testing. The syringe and needle were connected. The Flip-Off® disk was removed and the vial stopper was pierced using the syringe needle. No air was expelled from the syringe into the vial to aid extraction. The entire contents of the inverted vial were extracted as far as possible in the syringe. The syringe needle was removed from the vial stopper. With the needle pointing upwards the syringe was tapped to collapse any air bubbles. Air was carefully expelled from the syringe and needle until the first signs of liquid emerged from the needle tip. The syringe content was expelled (without emptying the needle) into a tared glass beaker. The net weight of expelled contents ($W_{extr}$) was recorded. The vial gross weight after solution withdrawal ($W_{resid}$, including Flip-Off® disk weight) was recorded (FIG. 2).

The hold-up volume in vial and withdrawal syringe ($V_{HU}$) was calculated using the following formula:

$$V_{HU}=(W_{fill}-W_{extr})/\rho \qquad \text{(formula 1)}.$$

The hold-up volume in vial ($V_{HUv}$) was calculated using the following formula:

$$V_{HUv}=(W_{resid}-W_{tare})/\rho \qquad \text{(formula 2)}.$$

The hold-up volume in withdrawal syringe ($V_{HUs}$) was indirectly obtained by difference:

$$V_{HUs}=V_{HU}-V_{HUv} \qquad \text{(formula 3)}.$$

The effect of fill volume, solution viscosity, vial format (fixed effects) and analyst (random effect) on hold-up volume results in vial and withdrawal syringe ($V_{HU}$) was analysed using a mixed model ($\alpha$=0.05). A logarithmic transformation was applied to $V_{HU}$ and viscosity values. The relative extractable volume test method variability ($RSD_{analysis}=\sigma_{analysis}/V_{HU}$) obtained by regression analysis (log-log model) was defined as the combination of the vial-to-vial (model root mean square error) and analyst variabilities.

Filling process variability determination: The filling process variability was estimated using in-process fill weight values from 82 batches involving 17 vialled drug product presentations filled using a peristaltic pump. The viscosity, concentration and fill volume were ranging from 1 to 20 mPa·s, 1 to 160 mg/mL and 1.0 to 16.8 mL, respectively. The actual fill weight dependence with target fill weight ($V_{fill}$, fixed effect) and batch (random effect) was evaluated using a mixed model ($\alpha$=0.05). A logarithmic transformation was applied to actual and target fill weights. Two sources of filling variability were estimated (FIG. 1): average relative filling bias ($RB_{filling}=B_{filling}/(V_{label}+V_{HU})$, root mean square of best linear unbiased predictors for batch effect) and relative filling precision ($RSD_{filling}=\sigma_{filling}/(V_{label}+V_{HU})$ model root mean square error, vial-to-vial variation).

Total variability determination: Total variability was calculated as the root sum of squares of the filling precision and extractable volume test method variability (equation 1):

$$\sigma_{total} = \sqrt{\sigma_{filling}^2 + \sigma_{analysis}^2}.$$

Data analysis: Statistical analysis was performed using JMP 11.0.0 (SAS Institute). Graphs were created using Prism 8.1.1 (GraphPad Software).

Results

Figure 3:
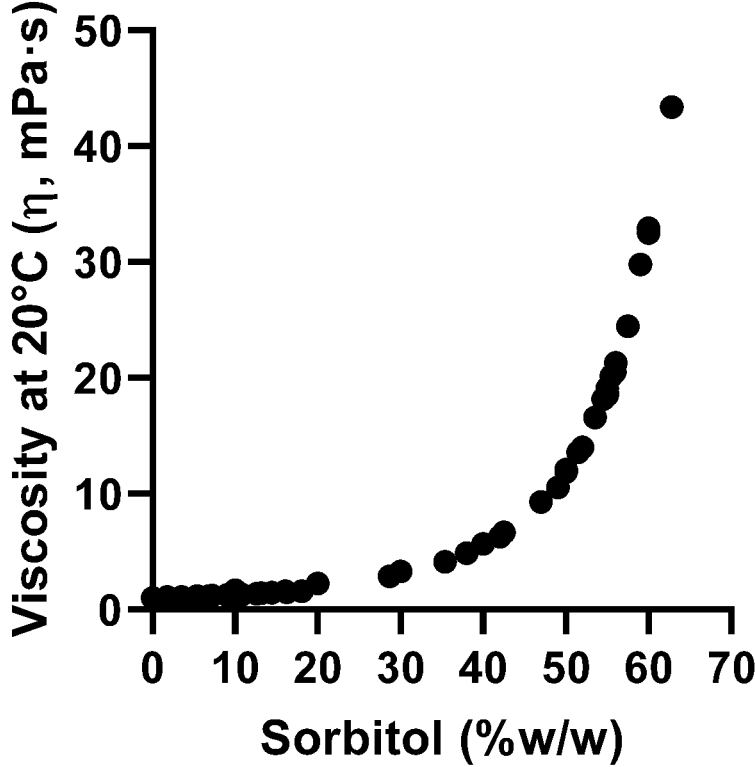
FIG. 3: Evolution of viscosity with sorbitol concentration in water.

Literature and preliminary trials data show an exponential increase of viscosity (at 20° C.) with sorbitol concentration (FIG. 3; Jiang et al., 2013), PEG concentration (Metha et al., 2020) or antibodies concentration (Shieu et al., 2014). Seven sorbitol-based aqueous solutions were prepared to cover a viscosity range of 1 to 40 mPa·s, which is typical for a certain numbers of drug products (Table 2).

$V_{HUv}$ and $V_{HU}$ values were surprisingly found to be independent from the fill volume but dependent on the solution viscosity and vial format (Table 3). Post-hoc multiple comparisons of $V_{HUv}$ and $V_{HU}$ values per vial format using the Tukey-Kramer Honestly Significant Difference method ($\alpha$=0.05) identified 2 different groups among $V_{HUv}$ and $V_{HU}$ data: 13 mm (2R) and 20 mm (6R, 10R and 20R) neck diameter vials.

No significant impact of fill volume and solution viscosity on $V_{HUs}$ values was observed. The following $V_{HUs}$ average and standard deviation values were obtained (n≥87): 88±35 µL (3 mL syringes), 91±38 µL (5 ml syringes), 107±44 µL (10 ml syringes) and 128±51 µL (20 ml syringes).

The models presented were built to predict $V_{HU}$ as a function of sorbitol viscosity ($\eta$ in mPa·s, at 20° C.; Equation 3):

$$V_{HU} = V_{HU}^{water} \times \eta^{1/7}.$$

With a container neck diameter of 13 mm, equation 3 reads $V_{HU}=174\times\eta^{1/7}$ and with a container neck diameter of 20 mm, equation 3 reads $V_{HU}=262\times\eta^{1/7}$. (Indeed, the value $V_{HU}^{water}$ was calculated as being 174, expressed in µl, for a neck diameter of 13 mm, and 262, also expressed in µl for a neck diameter of 20 mm).

The extractable volume test method variability ($RSD_{analysis}$) was calculated: 23.56% (Table 4). The analyst and vial-to-vial contributions to analytical variability were 32% and 68%, respectively.

US 12,583,638 B2

13

Figure 4A:
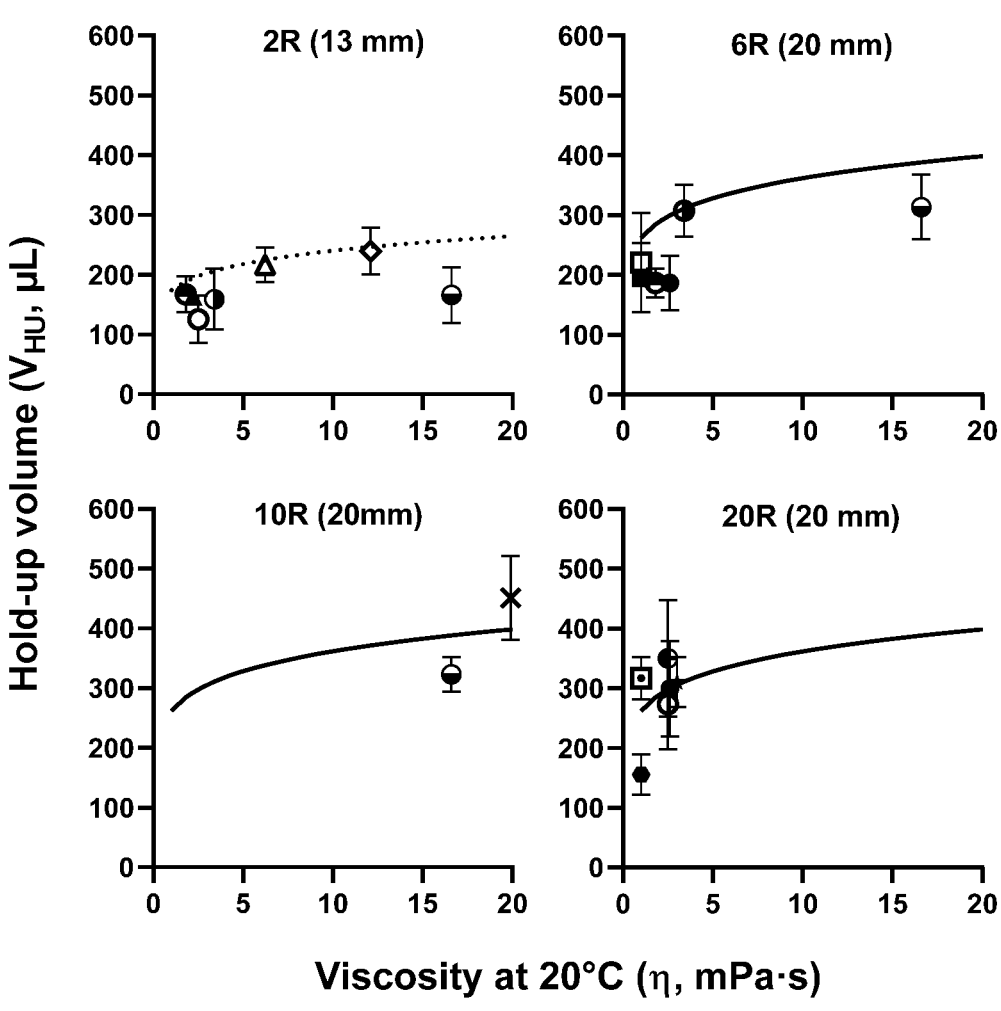
FIG. 4: A) Hold-up volumes in vial and withdrawal syringe ($V_{HU}$) of one monoclonal antibody having an IgG1 format (hexagon), one antibody having a fAb format (cross), various monoclonal antibodies having an IgG4 format (circles), two bispecific antibodies having an IgG4 format (triangles), one single domain antibody (diamond), one trispecific antibody (star) and SMD (various Small Molecule Drugs) (squares) drug product presentations in 13 mm (2R) or 20 mm (6R, 10R or 20R) vials. Sorbitol models for 13 mm (red dashed line) and 20 mm (blue plain line) vial neck diameter vials. Error bars reflect standard deviation from replicate batches. B) Data from FIG. 4A presented per vial neck diameter. The 95% confidence intervals on sorbitol models are illustrated (dotted lines).
Figure 4B:
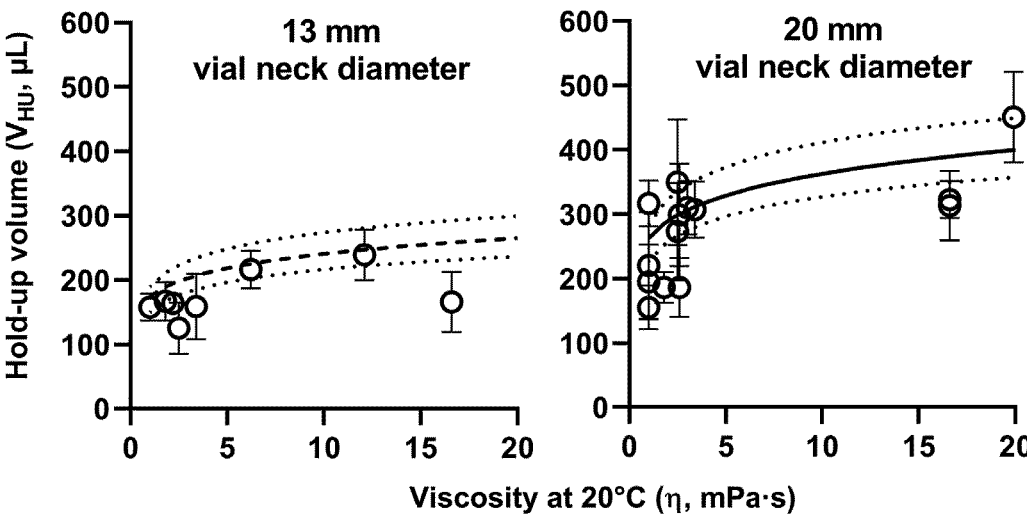

The predictability of sorbitol models was evaluated with 20 drug product presentations of various proteins/antibodies and SMD molecules of therapeutic interest (Table 6). Overall, the sorbitol model has good prediction properties but slightly overestimates $V_{HU}$ values in the 100-200 µL range (FIG. 4).

No significant impact of viscosity on filling variability was observed. The in-process fill weight data were analysed per vial neck diameter as a larger variability was observed for low fill volumes. The batch-to-batch and vial-to-vial contributions to filling variability were respectively 23% and 77% (for the 13 mm vials), and 47% and 53% (for the 20 mm vials). Filling precision ($RSD_{filling}$) values were 1.23% and 0.47% for 13 mm and 20 mm neck diameter vials, respectively (full set of data not shown).

The average filling biases ($B_{filling}$) were 0.68% and 0.44% for 13 mm and 20 mm vials, respectively (Table 4).

Figure 1:
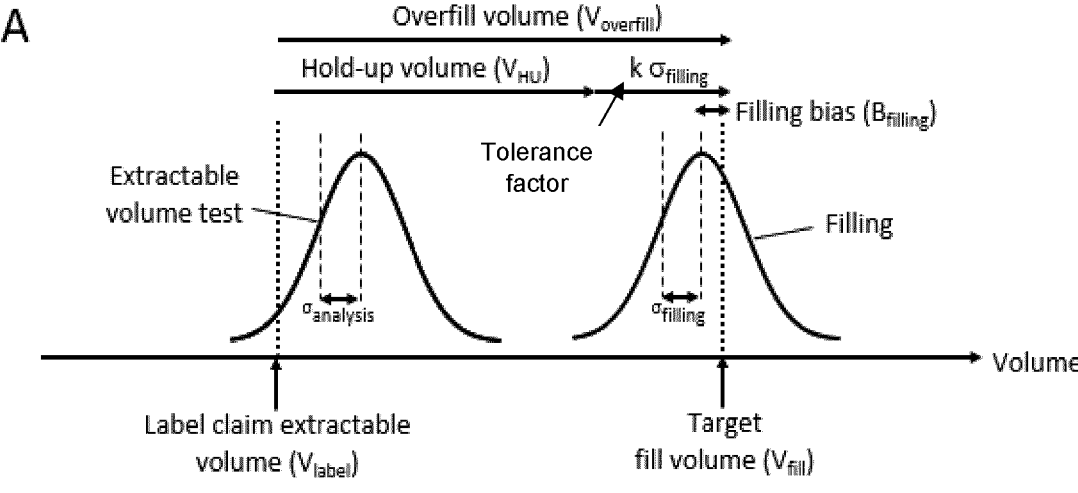
FIG. 1: State-of-the-art approach (A). Approach according to the invention, equation (1) (B) or equation (1bis) (C) for excess volume definition.
Figure 1:
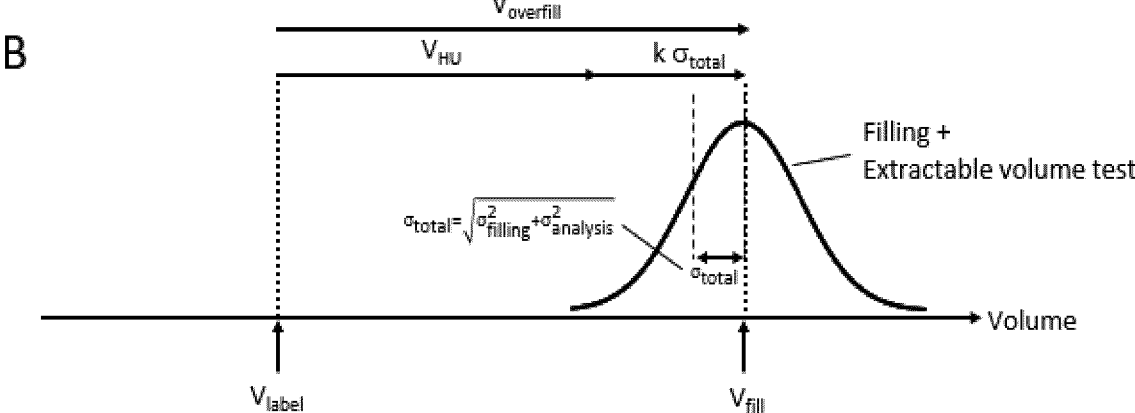
Figure 1:
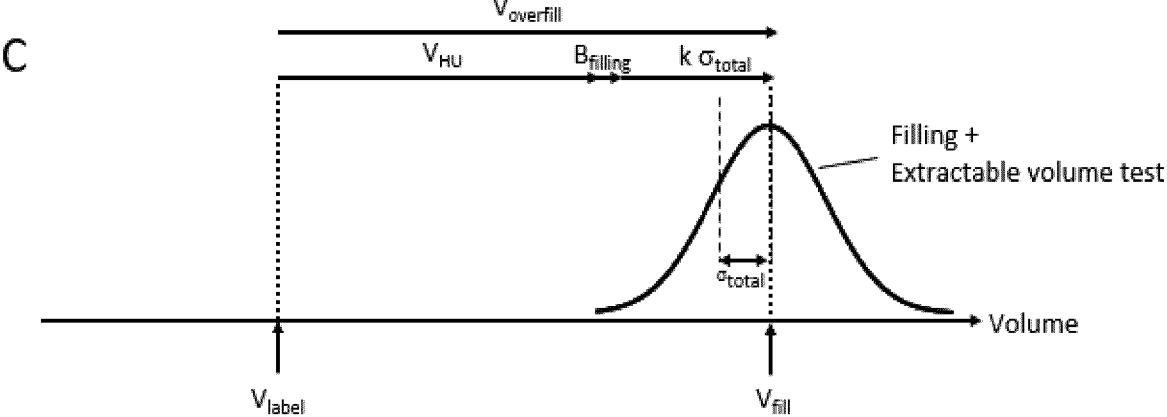

The strategy proposed to predict the excess volume of a liquid-in-vial drug product presentation is illustrated in FIG. 1 (Panels B/C) and equation 5 (derived from equation 1) and alternative equation 5bis (derived from equation 1bis). The input parameters of this model are $V_{label}$ (expressed in mL), drug product viscosity at 20° C. (η, in mPa·s) and vial neck diameter (13 mm or 20 mm). The tolerance factor, k, to ensure the extraction of a volume larger than or equal to $V_{label}$ was defined as the 99.73% quantile of a standard normal distribution ($z_{0.9973}$=2.78).

$$V_{overfill} = V_{HU}^{water} \times \eta^{1/7} + k \times \sigma_{total}.$$

Equation 5

$$V_{overfill} = V_{HU}^{water} \times \eta^{1/7} + B_{filling} + k * \sigma_{total}.$$

Equation 5bis

Figure 5:
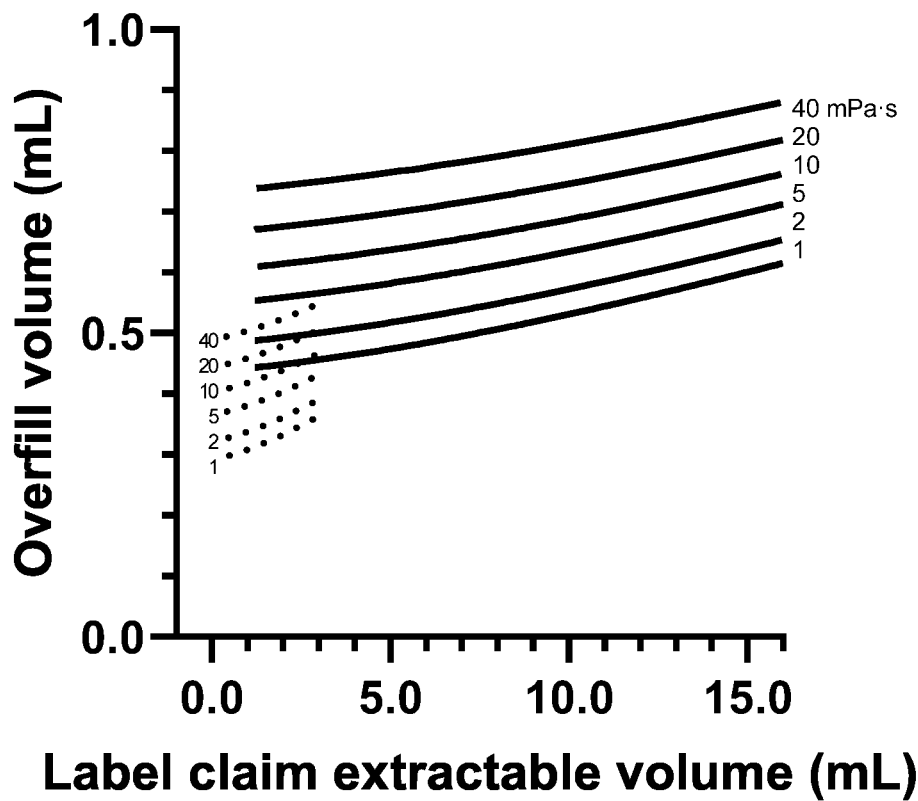
FIG. 5: Excess volume predictive model for 13 mm (dashed line) and 20 mm (plain line) vial neck diameter vials, within a viscosity range of 1 to 40 mPa·s.

This model is illustrated in FIG. 5. The extractable volumes presented cover a range from 20% to 80% of the nominal capacity of 13 mm (2R to 4R) and 20 mm (6R to 20R) vials.

Discussion

Early stage development products are typically filled in small capacity vials below their nominal volume to limit drug product wastage from partially used units. This approach does not consider the waste originating from the excess volume added to compensate for hold-up volumes in vial and withdrawal device ($V_{HU}$). The excess volume to ensure the labelled volume extraction from a small capacity vial could be larger than the one recommended in the FDA guidelines and should therefore be justified based on experimental data, to fulfil the regulatory requirements.

The availability of drug product material is often limited, especially in early stages of development, leading to an interest in predictive modelling to limit extractable volume testing. A $V_{HU}$ predictive model in vials (2R, 6R and 10R) and syringes (1 to 10 mL) was proposed previously, based on extractable volume data from aqueous polyethylene glycol (PEG) 400 solutions in the 1-30 mPa·s viscosity range. This model predicts different $V_{HU}$ values for 6R and 10R vials, while our approach suggests an identical $V_{HU v}$/$V_{HU}$ value for 6R and 10R vials as they share the same stopper internal geometry.

The experimental $V_{HU v}$ and $V_{HU s}$ values (Table 3) are of the same order of magnitude as reported previously: 150-200 µL and 100 µL, respectively. The $V_{HU}$ values of PEG 400 and some molecules of therapeutic interest (FIG. 4) were overestimated by the sorbitol model (Equation 3), probably due to differences in surface tension, adsorption to container, glass surface area or vial shoulder geometry. While a prediction model may help in reducing testing, this emphasizes the need of verifying experimentally the predicted $V_{HU}$ value of a given drug product formulation or presentation.

Excess volume is traditionally defined considering the hold-up volume ($V_{HU}$) and filling process tolerance. The total filling process variability values are in the ranges reported in literature (0.25% to 1.0%). The proposed overfill prediction model (equation 1 and equation 1bis, or alternatively equation 5 and equation 5bis) is based on a total variability approach, including both the process (filling precision and bias) and analytical (extractable volume testing) variabilities. This methodology allows capturing all sources of variation, in order to limit the risk of out-of-specification testing results.

CONCLUSION

A total variability approach to the excess (or overfill) volume prediction of liquid-in-vial drug products is proposed, considering product viscosity, vial neck diameter, filling variability and extractable volume test variability.

The use of this prediction model could allow reducing testing to support overfill volume definition, especially in early phases of development where material availability can be limited. It proves also utility at late stage of development as well as once a drug product is commercialized. These methods also lead to a better process control.

TABLE 1

Recommended excess volumes from the FDA (see document USP <1151>)

| Labelled size (mL) | Recommended Excess Volume | |
| | For mobile liquids (mL) | For viscous liquids (mL) |
| --- | --- | --- |
| 0.5 | 0.10 | 0.12 |
| 1.0 | 0.10 | 0.15 |
| 2.0 | 0.15 | 0.25 |
| 5.0 | 0.30 | 0.50 |
| 10.0 | 0.50 | 0.70 |
| 20.0 | 0.60 | 0.90 |
| 30.0 | 0.80 | 1.20 |
| 50.0 or more | 2% | 3% |

TABLE 2

Description of sorbitol-based aqueous solutions.

| Sorbitol (% w/w) | Viscosity at 20° C. (η, mPa · s) | Density at 20° C. (ρ, g/mL) |
| --- | --- | --- |
| 0.00 | 1.04 | 0.9980 |
| 28.66 | 2.90 | 1.1069 |
| 35.35 | 4.13 | 1.1348 |
| 42.14 | 6.40 | 1.1641 |
| 49.03 | 10.58 | 1.1950 |
| 55.91 | 20.51 | 1.2268 |
| 62.81 | 43.39 | 1.2596 |

TABLE 3

Hold-up volumes in vial and syringe. The average and
standard deviation values are reported (n ≥ 10).

| Viscosity | Hold-up | Vial format | | | |
|---|---|---|---|---|---|
| (η, mPa · s) | volume (μL) | 2R | 6R | 10R | 20R |
| 1.04 | Vial ($V_{HUv}$) | 115 ± 25 | 207 ± 45 | 193 ± 30 | 113 ± 62 |
| | Syringe ($V_{HUs}$) | 62 ± 16 | 132 ± 59 | 124 ± 81 | 129 ± 39 |
| | Vial + Syringe ($V_{HU}$) | 177 ± 34 | 338 ± 87 | 317 ± 73 | 242 ± 74 |
| 2.90 | Vial ($V_{HUv}$) | 115 ± 27 | 205 ± 29 | 250 ± 25 | 185 ± 59 |
| | Syringe ($V_{HUs}$) | 89 ± 36 | 66 ± 28 | 125 ± 14 | 138 ± 68 |
| | Vial + Syringe ($V_{HU}$) | 204 ± 52 | 271 ± 31 | 375 ± 32 | 323 ± 72 |
| 4.13 | Vial ($V_{HUv}$) | 122 ± 18 | 203 ± 29 | 257 ± 28 | 162 ± 36 |
| | Syringe ($V_{HUs}$) | 89 ± 48 | 65 ± 30 | 67 ± 24 | 159 ± 32 |
| | Vial + Syringe ($V_{HU}$) | 211 ± 37 | 268 ± 53 | 324 ± 32 | 321 ± 50 |
| 6.40 | Vial ($V_{HUv}$) | 140 ± 24 | 221 ± 39 | 292 ± 34 | 154 ± 40 |
| | Syringe ($V_{HUs}$) | 105 ± 30 | 115 ± 43 | 100 ± 44 | 77 ± 22 |
| | Vial + Syringe ($V_{HU}$) | 245 ± 39 | 336 ± 50 | 393 ± 65 | 231 ± 52 |
| 10.58 | Vial ($V_{HUv}$) | 146 ± 30 | 313 ± 65 | 283 ± 17 | 197 ± 72 |
| | Syringe ($V_{HUs}$) | 61 ± 27 | 98 ± 12 | 111 ± 48 | 91 ± 29 |
| | Vial + Syringe ($V_{HU}$) | 206 ± 28 | 411 ± 59 | 394 ± 41 | 288 ± 73 |
| 20.51 | Vial ($V_{HUv}$) | 168 ± 36 | 279 ± 41 | 374 ± 61 | 295 ± 88 |
| | Syringe ($V_{HUs}$) | 99 ± 25 | 86 ± 10 | 123 ± 36 | 128 ± 31 |
| | Vial + Syringe ($V_{HU}$) | 267 ± 42 | 366 ± 39 | 497 ± 54 | 423 ± 85 |
| 43.39 | Vial ($V_{HUv}$) | 184 ± 26 | 319 ± 53 | 361 ± 41 | 440 ± 114 |
| | Syringe ($V_{HUs}$) | 112 ± 26 | 92 ± 15 | 81 ± 23 | 170 ± 33 |
| | Vial + Syringe ($V_{HU}$) | 295 ± 41 | 411 ± 54 | 442 ± 46 | 610 ± 107 |

TABLE 4

Filling process and extractable volume test method variabilities

| | Vial neck diameter | |
|---|---|---|
| | 13 mm | 20 mm |
| $RB_{filling}$ (%) | 0.68 | 0.44 |
| $RSD_{filling}$ (%) | 1.23 | 0.47 |
| $RSD_{analysis}$ (%) | 23.56 | 23.56 |

TABLE 5

Description of the molecules evaluated in this study

| Product* | Format/type | Viscosity (cP) | Formulation pH | pI |
|---|---|---|---|---|
| Molecule 1 | SMD | 1.0 | 5.5 | N/A |
| Molecule 2 | SMD | 1.0 | 5.5 | N/A |
| Molecule 3 | SMD | 1.0 | 4.0 | N/A |
| Molecule 4 | IgG1 | 1.0 | 7.4 | 9.0 |
| Molecule 5 | fAb'-PEG | 19.9 | 5.0 | 7.9 |
| Molecule 6 | IgG4 | 2.6 | 6.0 | 6.1 |
| Molecule 7 | IgG4 | 2.5 | 6.0 | 5.8 |
| Molecule 8 | IgG4 | 1.8 | 5.0 | 6.4 |
| Molecule 9 | IgG4 | 16.6 | 5.6 | 7.8 |
| Molecule 10 | IgG4 | 2.5 | 5.5 | 8.6 |
| Molecule 11 | IgG4 | 3.4 | 5.5 | 7.7 |
| Molecule 12 | bispecific | 2.2 | 5.5 | 9.1 |
| Molecule 13 | bispecific | 6.2 | 5.5 | 9.1 |
| Molecule 14 | single domain | 12.1 | 5.0 | 8.4 |
| Molecule 15 | trispecific | 2.0-5.0 | 6.8 | 6.3 |
| Molecule 16 | Peptide | 1.0 | 7.0 | 4.6 |

*SMD = Small Molecule Drug. The other compounds in this Table are antibody-based
molecules (mAbs and fAbs).

TABLE 6

Hold-up volumes (VHU) of various drug product presentations,
in vial and withdrawal syringe. The average and standard
deviation VHU values are reported. Vial format and number
of measurements (n) are provided into brackets.

| Vial neck diameter (mm) | Viscosity at 20 or 25° C. (η, mPa · s) | Drug Product | Hold-up volume ($V_{HU}$, μL) |
|---|---|---|---|
| 13 | 1.0 | Molecule 16 | 158 ± 21 (2R, n = 45) |
| | 1.8 | Molecule 8 | 167 ± 30 (2R, n = 40) |
| | 2.2 | Molecule 12 | 164 ± 6 (2R, n = 2) |
| | 2.5 | Molecule 7 | 125 ± 40 (2R, n = 15) |
| | 3.4 | Molecule 11 | 159 ± 51 (2R, n = 47) |
| | 6.2 | Molecule 13 | 216 ± 29 (2R, n = 6) |
| | 12.1 | Molecule 14 | 239 ± 39 (2R, n = 30) |
| | 16.6 | Molecule 9 | 166 ± 47 (2R, n = 10) |
| 20 | 1.0 | Molecule 1 | 195 ± 58 (6R, n = 34) |
| | | Molecule 2 | 220 ± 83 (6R, n = 141) |
| | | Molecule 3 | 317 ± 36 (20R, n = 103) |
| | | Molecule 4 | 155 ± 34 (20R, n = 34) |
| | 1.8 | Molecule 8 | 186 ± 24 (6R, n = 10) |
| | 2.5 | Molecule 7 | 273 ± 76 (20R, n = 8) |
| | | Molecule 10 | 350 ± 98 (20R, n = 15) |
| | 2.6 | Molecule 6 | 186 ± 46 (6R, n = 15) |
| | | | 299 ± 80 (20R, n = 21) |
| | 3.0 | Molecule 15 | 310 ± 42 (20R, n = 5) |
| | 3.4 | Molecule 11 | 307 ± 44 (6R, n = 18) |
| | 16.6 | Molecule 9 | 313 ± 54 (6R, n = 132) |
| | | | 323 ± 29 (10R, n = 28) |
| | 19.9 | Molecule 5 | 451 ± 70 (10R, n = 12) |

REFERENCES

1. USP-NF General Chapter <1> (herein USP<1>). Injections. In United States Pharmacopoeia, editor. USP43-NF38, edition of 2020, Rockville, MD, United States.

2. USP-NF General Chapter <1151> (herein USP<1151>). Pharmaceutical Dosage Forms. In United States Pharmacopoeia, editor. USP43-NF38, edition of 2020. Rockville, MD, United States.

3. USP-NF General Chapter <697> (herein USP<697>). Container Content for Injections. In United States Pharmacopoeia, editor. USP43-NF38, edition of 2020. Rockville, MD, United States.

4. Ph. Eur. monograph 2.9.17. Test for Extractable Volume of Parenteral Preparations. In European Pharmacopoeia, editor. 10th Edition, published in 2019. Strasbourg, France.

5. JP General Test 6.05. Test for Extractable Volume of Parenteral Preparations. In The Japanese Pharmacopoeia, editor. 17th Edition (JP XVII), published in 2016. Tokyo, Japan.

6. FDA Guidance for Industry. Allowable Excess Volume and Labeled Vial Fill Size injectable Drug and Biological Products. Edition of 2015. In U.S. Food and Drug Administration, editor. FDA Guidances, White Oak, MD, United States.

7. Gotham D, Barber M J, Hill A M. Estimation of Cost-Based Prices for Injectable Medicines in the WHO Essential Medicines List. 2019. BMJ Open 9: e027780.

8. Hatswell A J, Porter J K. Reducing Drug Wastage in Pharmaceuticals Dosed by Weight or Body Surface Areas by Optimising Vial Sizes. 2019. Appl. Health Econ. Health Policy 17: 391-397.

9. Manger W. 2019. Sterile Drug Product Process Validation. In Nema S, Ludwig J D, editors. Parenteral Medications, Fourth Edition: CRC Press. p 852-862.

10. Dixon D, Gudinas A. 2018. Biotherapeutic Drug Product Manufacturing and Process Development. In Warne N W, Mahler H, editors. Challenges in Protein Product Development: Springer International Publishing. p 353-383.

11. Sethuraman A, Pan X, Mehta B, Radhakrishnan V. 2010. Filling Process and Technologies for Liquid Biopharmaceuticals. In Jameel F, Hershenson S, editors. Formulation and Process Development Strategies for Manufacturing Biopharmaceuticals: Wiley. p 839-856.

12. Joglekar A M. 2010. Industrial Statistics. Practical Methods and Guidance for Improved Performance: Wiley.

13. Kruszynski M A. 2016. Sterile Product Filling, Stoppering and Sealing. In Akers M J, editor. Sterile Drug Products. Formulation, Packaging, Manufacturing and Quality: CRC Press. p 278-293.

14. Levine C S. 2007. Validation of Packaging Operations. In Agalloco J P, Carleton F J, editors. Validation of Pharmaceutical Processes: CRC Press. p 429-442.

15. ICH Q4B Annex 2 (R1). Test for Extractable Volume of Parenteral Preparations General Chapter. International Council for Harmonisation of Technical Requirements for Pharmaceuticals for Human Use, editor. ICH Quality Guidelines, Geneva, Switzerland.

16. Jiang X, Zhu C, Ma Y. Density and Viscosity of Sorbitol/Maltitol in L-Ascorbic Acid Aqueous Solutions at T=(293.15 to 323.15) K. 2013. J. Mol. Liq. 188: 67-73.

17. Mehta S, Subramanian S, Brown R, et al. Use of a Predictive Regression Model for Estimating Hold-Up Volume for Biologic Drug Product Presentations. 2020. PDA J Pharm Sci Technol 74: 290-300.

18. WO2015/197772

19. Shieu W, Torhan S A, Chan E, et al. Filling of High-Concentration Monoclonal Antibody Formulations into Pre-Filled Syringes. Filling parameter investigation and optimization. 2014. PDA J Pharm Sci Technol 68: 153-163.

20. Jameel F, Undey C, Kovach P M, Tanglertpaibul J. 2015. Application of QbD Elements in the Development and Scale-Up of Commercial Filling Process. In Jameel F, Hershenson S, Khan M A, Martin-Moe S, editors. Quality by Design for Biopharmaceutical Drug Product Development: Springer New York. p 265-302.

21. Akers M J. 2016. Overview of Sterile Product Manufacturing. In Akers M J, editor. Sterile Drug Products. Formulation, Packaging, Manufacturing and Quality: CRC Press. p 180-193.

The invention claimed is:

1. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises using a computer to implement:

a) receiving a first set of values, wherein said first set of values comprises:

i) an expected residual volume ($V_{HU}$) of the liquid drug product in the container and a withdrawal syringe after dispensing of the liquid drug product from the container using the withdrawal syringe, said expected residual volume being determined using equation (3): $V_{HU} = V_{HU}^{water} \times \eta^{1/7}$, where $V_{HU}^{water}$ is a value depending on the container's neck diameter;

ii) a total variability ($\sigma_{total}$) of container filling of a filling equipment to be used to fill the container with the liquid drug product, and extractable volume testing;

iii) a predetermined tolerance factor (k);

iv) a viscosity, $\eta$, corresponding to the viscosity of the liquid drug product;

V) neck diameter of the container;

b) determining a predicted excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation, and c) outputting the predicted excess volume to be added.

2. The method according to claim 1, wherein k has a value ranged from 1.64 to 2.78.

3. The method according to claim 1, wherein the first set of values optionally further includes an average filling bias ($B_{filling}$), and wherein determining the predicted excess volume comprises performing a summation over at least $V_{HU}$, $k \times \sigma_{total}$, and $B_{filling}$, as shown in version (1bis) of equation (1):

$$V_{overfill} = V_{HU} + B_{filling} + k \times \sigma_{total}.$$

4. The method according to claim 3, wherein $B_{filling}$ is predetermined experimentally.

5. The method according to claim 1, wherein:

i) if the neck diameter of the container is 13 mm, the value $V_{HU}^{water}$ is 174 and is expressed in μl, and ii) if the neck diameter of the container is 20 mm, the value $V_{HU}^{water}$ is 262 and is expressed in μl.

6. The method according to claim 1, wherein $\sigma_{total}$ is calculated using equation (4):

$$\sigma_{total} = \sqrt{\sigma_{filling}^2 + \sigma_{analysis}^2}$$

wherein $\sigma_{filling}$ is a filling standard deviation and $\sigma_{analysis}$ is an analytical test method standard deviation.

7. The method according to claim 1, wherein the liquid drug product is to be dispensed from the container using the withdrawal syringe.

8. The method according to claim 1, wherein the predicted excess volume is a value transmitted to a database, a dataset, a computer readable memory, a computer readable medium, a computer processor, a computer network, a printout device, a visual display, or a wireless receiver, optionally to allow display of the predicted excess volume or communication of the predicted excess volume as sound.

9. The method according to claim 1, wherein the container is an ampoule, a glass vial, a tube, a bottle a syringe, a cartridge, or other such reservoir suitable for storage of the liquid drug product.

10. A method for filling a container with a liquid drug product, wherein the method comprises the steps of:

a) providing a container to be filled with the liquid drug product, b) filling the container with a total volume of the liquid drug product wherein the total volume of the liquid drug product corresponds to the label-claim volume of the container plus an excess volume, wherein the excess volume is determined according to claim 1, and c) optionally closing the container with at least a stopper.

11. The method according to claim 10, wherein the container is an ampoule, a glass vial, a tube, a bottle a syringe, a cartridge, or other such reservoir suitable for storage of the liquid drug product.

12. A method for determining a total residual volume ($V_{HU}$) of a liquid drug product in a container and a withdrawal syringe, wherein $V_{HU}$ is determined according to equation (3):

$$V_{HU} = V_{HU}^{water} \times \eta^{1/7},$$

where $\eta$ is the viscosity of the liquid drug product and $V_{HU}^{water}$ is a value depending on the neck diameter.

13. The method according to claim 12, wherein:

i) if the neck diameter of the container is 13 mm, the value $V_{HU}^{water}$ is 174 and is expressed in µl, and ii) if the neck diameter of the container is 20 mm, the value $V_{HU}^{water}$ is 262 and is expressed in µl.

14. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises using a computer to implement:

a) receiving a first set of values, wherein said first set of values comprises:

i) an expected residual volume ($V_{HU}$) of the liquid drug product in the container and a withdrawal syringe after dispensing of the liquid drug product from the container using the withdrawal syringe;

ii) a total variability ($\sigma_{total}$) of container filling of a filling equipment to be used to fill the container with the liquid drug product, and extractable volume testing;

iii) a predetermined tolerance factor (k);

b) determining a predicted excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation, and c) outputting the predicted excess volume to be added, wherein $V_{HU}$ is determined by:

i) weighing an empty first container to be filled with the liquid drug product to obtain $W_{tare}$, ii) filling the empty first container with a given volume of the liquid drug product, iii) weighing the filled first container to obtain $W_{full}$, iv) obtaining the weight of the liquid drug product contained in the filled first container ($W_{prod}$), wherein $W_{prod} = W_{full} - W_{tare}$, v) withdrawing the liquid drug product from the filled first container with a syringe comprising a needle, vi) completely expelling the withdrawn liquid drug product from the syringe into a tared, clean and dry second container, without emptying the needle, vii) weighing the second container filled with the expelled liquid drug product to obtain a value $W_{extr}$, viii) determining $V_{HU}$ using equation (2): $V_{HU} = (W_{prod} - W_{extr})/\rho$, wherein the liquid drug product's density is represented by p.

15. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises using a computer to implement:

a) receiving a first set of values, wherein said first set of values comprises:

i) an expected residual volume ($V_{HU}$) of the liquid drug product in the container and a withdrawal syringe after dispensing of the liquid drug product from the container using the withdrawal syringe;

ii) a total variability ($\sigma_{total}$) of container filling of a filling equipment to be used to fill the container with the liquid drug product, and extractable volume testing;

iii) a predetermined tolerance factor (k);

b) determining a predicted excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation, and c) outputting the predicted excess volume to be added, wherein $V_{HU}$ is determined by:

i) filling an empty first container with a given weight of liquid drug product ($W_{prod}$), ii) withdrawing the liquid drug product from the filled first container with a syringe comprising a needle, iii) expelling the withdrawn liquid drug product from the syringe into a tared, clean and dry second container, without emptying the needle, iv) weighing the expelled liquid drug product in the second container to obtain a value $W_{extr}$, and v) determining $V_{HU}$ using equation (2): $V_{HU} = (W_{prod} - W_{extr})/\rho$, wherein the liquid drug product's density is represented by p.

16. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises:

a) collecting a first set of values, wherein said first set of values comprises:

i) an expected residual volume ($V_{HU}$) of the liquid drug product in the container and a withdrawal syringe after dispensing of the liquid drug product from the container using the withdrawal syringe;

ii) a total variability ($\sigma_{total}$) of container filling of a filling equipment to be used to fill the container with the liquid drug product, and extractable volume testing;

iii) a predetermined tolerance factor (k);

iv) the container neck diameter;

v) a viscosity, n, corresponding to the viscosity of the liquid drug product;

b) predicting the excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation and where $V_{HU}$ is determined according to equation (3): $V_{HU} = V_{HU}^{water} \times \eta^{1/7}$, where $V_{HU}^{water}$ is a value depending on the container's neck diameter.

17. The method according to claim 16, wherein:

i) if the neck diameter of the container is 13 mm, the value $V_{HU}^{water}$ is 174 and is expressed in µl, and ii) if the neck diameter of the container is 20 mm, the value $V_{HU}^{water}$ is 262 and is expressed in µl.

18. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises:

a) collecting a first set of values, wherein said first set of values comprises:

i) an expected residual volume ($V_{HU}$) of the liquid drug product in the container and a withdrawal syringe after dispensing of the liquid drug product from the container using the withdrawal syringe;

ii) a total variability ($\sigma_{total}$) of container filling of a filling equipment to be used to fill the container with the liquid drug product, and extractable volume testing;

iii) a predetermined tolerance factor (k);

b) predicting the excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation, wherein $V_{HU}$ is determined by:

i) filling an empty first container with a given weight of liquid drug product ($W_{prod}$), ii) withdrawing the liquid drug product from the filled first container with a syringe comprising a needle, iii) expelling the withdrawn liquid in the syringe into a tared, clean and dry second container, without emptying the needle, iv) weighing the expelled liquid in the second container to obtain a value $W_{extr}$, v) determining Vu using equation (2): $V_{HU} = (W_{prod} - W_{extr})/\rho$, wherein the liquid drug product's density is represented by $\rho$.

19. A method of predicting an excess volume ($V_{overfill}$) of a liquid drug product to be added in a container comprising the liquid drug product, the excess volume being a volume of liquid drug product required in the container in addition to a label-claim volume ($V_{label}$), to ensure that the label-claim volume can be withdrawn from the container, wherein the method comprises:

a) collecting a first set of values, wherein said first set of values comprises:

i) an expected residual volume ($V_{HU}$) of the liquid drug product in the container and a withdrawal syringe after dispensing of the liquid drug product from the container using the withdrawal syringe;

ii) a total variability ($\sigma_{total}$) of container filling of a filling equipment to be used to fill the container with the liquid drug product, and extractable volume testing;

iii) a predetermined tolerance factor (k);

b) predicting the excess volume by performing a summation over at least $V_{HU}$ and $k \times \sigma_{total}$, as shown in equation (1), $$V_{overfill} = V_{HU} + k \times \sigma_{total} + A$$

where A represents an optional one or more further terms in the summation and where $V_{HU}$ is determined by:

i) weighing an empty first container to be filled with the liquid drug product to obtain $W_{tare}$, ii) filling the empty first container with a given volume of the liquid drug product, iii) weighing the filled first container to obtain $W_{full}$, iv) obtaining the weight of the liquid drug product contained in the filled first container ($W_{prod}$), wherein $W_{prod} = W_{full} - W_{tare}$, v) withdrawing the liquid drug product from the first container with a syringe comprising a needle, vi) completely expelling the withdrawn liquid drug product from the syringe into a tared, clean and dry second container, without emptying the needle, vii) weighing the second container filled with the expelled liquid drug product to obtain vii) a value $W_{extr}$, and viii) determining $V_{HU}$ using equation (2): $V_{HU} = (W_{prod} - W_{extr})/\rho$, wherein the liquid drug product's density is represented by $\rho$.

\* \* \* \* \*